(12) United States Patent
Kim et al.

(10) Patent No.: US 12,475,542 B2
(45) Date of Patent: Nov. 18, 2025

(54) IMAGE PROCESSING SYSTEM AND IMAGE PROCESSING METHOD

(71) Applicant: SK hynix Inc., Icheon-si (KR)

(72) Inventors: Min Gi Kim, Icheon-si (KR); Hyun Gu Shin, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 249 days.

(21) Appl. No.: 18/330,290

(22) Filed: Jun. 6, 2023

(65) Prior Publication Data
US 2024/0185398 A1   Jun. 6, 2024

(30) Foreign Application Priority Data
Dec. 5, 2022  (KR) .................. 10-2022-0167879

(51) Int. Cl.
  *G06T 5/70*   (2024.01)
  *G06T 5/20*   (2006.01)
  *G06V 10/56*  (2022.01)

(52) U.S. Cl.
  CPC ............. *G06T 5/70* (2024.01); *G06T 5/20* (2013.01); *G06V 10/56* (2022.01)

(58) Field of Classification Search
  CPC .............. H04N 25/60–69; H04N 23/81; G06T 5/00–94; G06V 10/56
  See application file for complete search history.

(56) References Cited

U.S. PATENT DOCUMENTS

| 9,693,078 | B2   | 6/2017  | Raina et al. |
| 2011/0090351 | A1* | 4/2011  | Cote ............ G06T 5/70 348/208.1 |
| 2022/0160316 | A1* | 5/2022  | Takahashi ...... A61B 6/482 |
| 2024/0373135 | A1* | 11/2024 | Fiedler ......... G06T 3/4015 |

FOREIGN PATENT DOCUMENTS

KR   1020160112226 A   9/2016

OTHER PUBLICATIONS

"Kernel (image processing)", Wikipedia, URL:https://en.wikipedia.org/wiki/Kernel_(image_processing).
Sarah Abraham, "Image Manipulation: Filters and Convolutions", University of Texas at Austin Computer Science Department, Elements of Graphics CS324e, URL: https://www.cs.utexas.edu/~theshark/courses/cs324e/lectures/cs324e-6.pdf.

* cited by examiner

*Primary Examiner* — Sean T Motsinger
(74) *Attorney, Agent, or Firm* — WILLIAM PARK AND ASSOCIATES LTD.

(57) ABSTRACT

An image processing device that reduces grid pattern noise in a captured image and which improves captured image quality may include an image input circuit configured to receive pixel values from an image sensor, a kernel manager configured to generate kernels corresponding to a grid pattern determined based on an N×N array pattern of a color filter array included in the image sensor, a preprocessor configured to perform a blur operation based on the pixel values and the kernels and to amplify pattern pixel values corresponding to the grid pattern, among the pixel values, and a grid pattern detector configured to change pixel values irrelevant to the grid pattern, among the pixel values, to a preset value based on the kernels and to generate a grid image including only the grid pattern.

20 Claims, 10 Drawing Sheets

IMAGE PROCESSING SYSTEM AND IMAGE PROCESSING METHOD

CROSS-REFERENCE TO RELATED APPLICATION

The present application claims priority under 35 U.S.C. § 119(a) to Korean patent application number 10-2022-0167879 filed on Dec. 5, 2022, in the Korean Intellectual Property Office, the entire disclosure of which is incorporated by reference herein.

BACKGROUND

1. Technical Field

Various embodiments of the present disclosure generally relate to an image processing system, and more particularly to an image processing system and an image processing method.

2. Related Art

Generally, image sensors may be classified into a charge coupled device (CCD) image sensor and a complementary metal oxide semiconductor (CMOS) image sensor. Recently, the CMOS image sensor, which has low manufacturing cost, has low power consumption, and facilitates integration with a peripheral circuit, has attracted attention.

An image sensor included in a smartphone, a tablet PC, or a digital camera may acquire image information of an external object by converting light reflected from the external object into an electrical signal. An image signal processing device may perform operations of converting the electrical signal acquired from the image sensor or improving image quality.

The image sensor may include a color filter array, and an image signal output from the image sensor may include information about light passing through the color filter array. The light passing through the color filter array may be scattered, and grid pattern noise may be included in the image signal due to the scattered light. Because the grid pattern noise may occur due to pixels included in the image sensor, an original image may be repeatedly damaged. The quality of a sensed image may be improved by removing grid pattern noise irrelevant to the original image.

SUMMARY

Various embodiments of the present disclosure are directed to an image processing system and an image processing method, which generate grid pattern detection kernels corresponding to an N×N array pattern of a color filter array and then detect grid pattern noise included in an input image.

An embodiment of the present disclosure may provide for an image processing device. The image processing device may include an image input circuit configured to receive pixel values from an image sensor, a kernel manager configured to generate kernels corresponding to a grid pattern determined based on a N×N array pattern of a color filter array included in the image sensor, a preprocessor configured to perform a blur operation on received pixel values and the kernels and to amplify pattern pixel values corresponding to the grid pattern, among the received pixel values, and a grid pattern detector configured to change received pixel values, not relevant to the grid pattern to a preset value based on the kernels and to generate a grid image including only the grid pattern.

An embodiment of the present disclosure may provide for an image processing system. The image processing system may include an image sensor configured to generate pixel values corresponding to an input image based on light passing through a color filter array, a kernel manager configured to generate kernels corresponding to a grid pattern determined based on an N×N array pattern of the color filter array, an image blurrer configured to remove normal noise smaller than the grid pattern included in the input image based on the pixel values and the kernels, a pixel value amplifier configured to amplify pattern pixel values corresponding to the grid pattern, among the pixel values, and a grid pattern detector configured to remove textures that are irrelevant to the grid pattern included in the input image based on the kernels and to detect the grid pattern included in the input image.

An embodiment of the present disclosure may provide for an image processing method. The image processing method may include generating kernels corresponding to a grid pattern determined based on an N×N array pattern of a color filter array included in an image sensor, removing normal noise smaller than the grid pattern included in an input image based on externally received pixel values and the kernels, amplifying pattern pixel values corresponding to the grid pattern, among the pixel values, and removing textures irrelevant to the grid pattern included in the input image, based on the kernels, and detecting the grid pattern included in the input image.

DETAILED DESCRIPTION

Specific structural or functional descriptions in the embodiments of the present disclosure introduced in this specification or application are provided as examples to describe embodiments according to the concept of the present disclosure. The embodiments according to the concept of the present disclosure may be practiced in various forms, and should not be construed as being limited to the embodiments described in the specification or application.

Various embodiments of the present disclosure will now be described more fully hereinafter with reference to the accompanying drawings, in which preferred embodiments of the present disclosure are shown, so that those skilled in the art can easily practice the technical spirit of the present disclosure.

Figure 1:
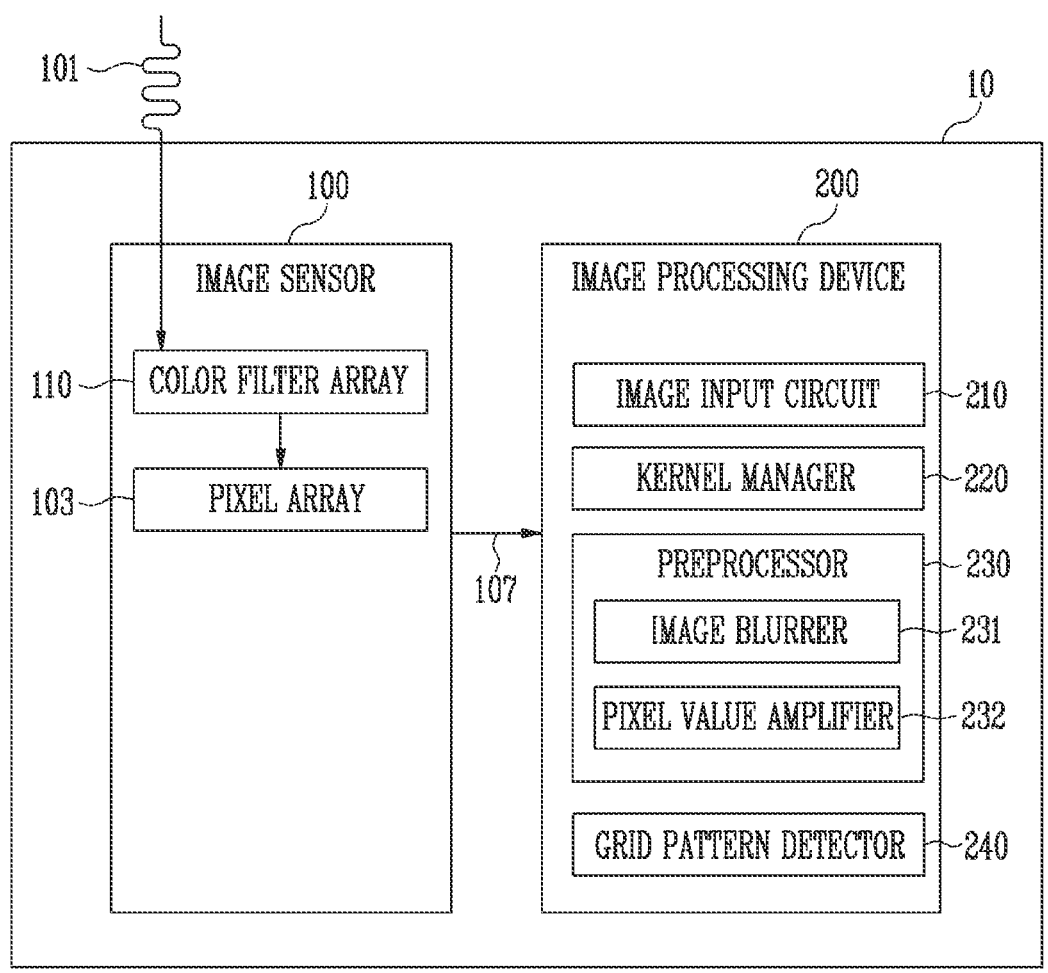
FIG. 1 is a diagram illustrating an image processing system according to an embodiment of the present disclosure.

FIG. 1 is a diagram illustrating an image processing system 10 according to an embodiment of the present disclosure.

Referring to FIG. 1, the image processing system 10 may include an image sensor 100 and an image processing device 200.

The image processing system 10 according to an embodiment may acquire image data and process the acquired image data. The image processing system 10 may store or display an output image on which an image processing operation is performed, or may output the output image to an external device. The image processing system 10 according to the embodiment may provide the output image to a host in response to a request received from the host. The image processing system 10 may improve the quality of a sensed image by performing the image processing operation based on the image data.

The image sensor 100 may generate image data based on externally received light 101. The image sensor 100 may include a pixel array 103 including pixels. The image sensor 100 may include a color filter array 110 in which color filters are arranged. The light received by the image sensor 100 may reach the pixel array 103 through the color filter array 110. Each of the pixels may correspond to a color filter determined depending on the arrangement of the color filter array 110. Each color filter may reflect light corresponding to a preset wavelength, and may allow only light corresponding to a specific wavelength to pass therethrough. Pixel values generated by the pixels may include information about color filters respectively corresponding to the pixels and information about the intensities of light components having reached respective pixels.

The image data generated by the image sensor 100 may include pixel values. The image sensor 100 may transfer the pixel values to the image processing device 200.

In order to improve the quality of the sensed image, the number of pixels included in the image sensor 100 may be increased. As more pixels are included in the pixel array 103, the size of one pixel may be decreased. Grid pattern noise may be included in the sensed image due to scattering of light occurring as the size of each pixel becomes smaller than a specific size. Because the degree of light scattering caused by pixels may vary depending on an image sensor manufacturing process, grid pattern noise may vary depending on the pixel features of the image sensor.

The image processing device 200 may perform a processing operation of improving image quality based on a plurality of pixel values received from the image sensor 100, and may output processed image data. Here, the processing operation may include electronic image stabilization (EIS), interpolation, tonal correction, image quality correction, size adjustment, etc.

As used herein, the term "kernel" refers to a matrix of numbers, used to adjust an image by multiplying pixels of an original image by values that make up the matrix or kernel. Kernels and such a multiplication process is commonly referred to as image convolution: an original image matrix is convolved with the kernel.

Image convolution itself is known, a description of which can be found at https://en.wikipedia.org/wiki/Kernel_(image_processing), the content of which is incorporated by reference. See also chrome-extension://efaidnbmnnnibp-cajpcglclefindmkaj/https://www.cs.utexas.edu/~ theshark/courses/cs324e/lectures/cs324e-6.pdf, which is also incorporated herein by reference.

The image processing device 200 may include an image input circuit 210, a kernel manager 220, a preprocessor 230, and a grid pattern detector 240. The preprocessor 230 may include an image blurrer 231 and a pixel value amplifier 232. The image processing device 200 may receive image data 107 from an external device, such as the image sensor 100, and may generate an image including a grid pattern. The kernels corresponding to the array pattern of the color filter array may be used to detect a grid pattern included in the input image 301. The image processing device 200 and the components included in the image processing device 200 will be described in detail later with reference to FIG. 3.

Figure 2:
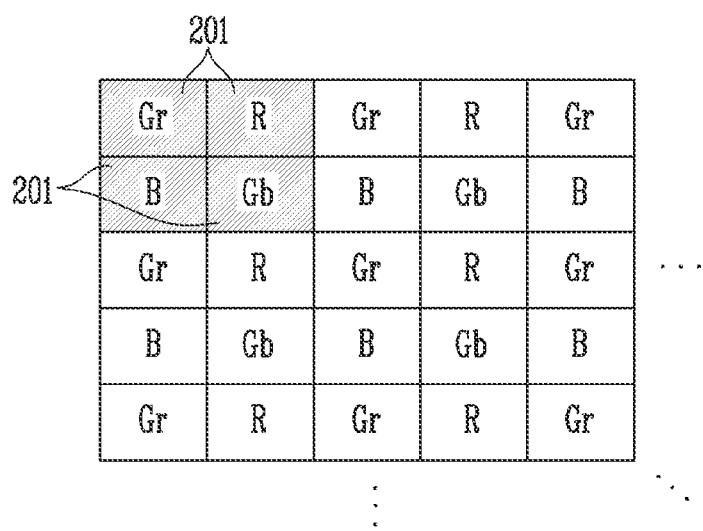
FIG. 2 is a diagram illustrating a Bayer pattern of a color filter array 110 of FIG. 1.

FIG. 2 is a diagram illustrating a Bayer pattern of the color filter array 110 of FIG. 1.

The color filter array may be arranged in a predefined pattern. For example, the color filter array may be arranged in a Bayer pattern. In FIG. 2, the Bayer pattern may be implemented as a repetition of 2×2 color filters indicated by shading 201. In the Bayer pattern, green color filters Gb and Gr may be arranged to diagonally opposite each other, and a blue color filter B and a red color filter R may be arranged at the remaining corners. The four, color filters B, Gb, Gr, and R are not necessarily limited to the arrangement structure illustrated in FIG. 2, and may be arranged based on the Bayer pattern illustrated in FIG. 2, but in various other forms. Further, the color filter array may be arranged in various patterns other than the Bayer pattern described with reference to FIG. 2. For example, the color filter array may be arranged in any one of a quad-Bayer pattern, a Nona-cell pattern, or a hexa-deca pattern.

Figure 3:
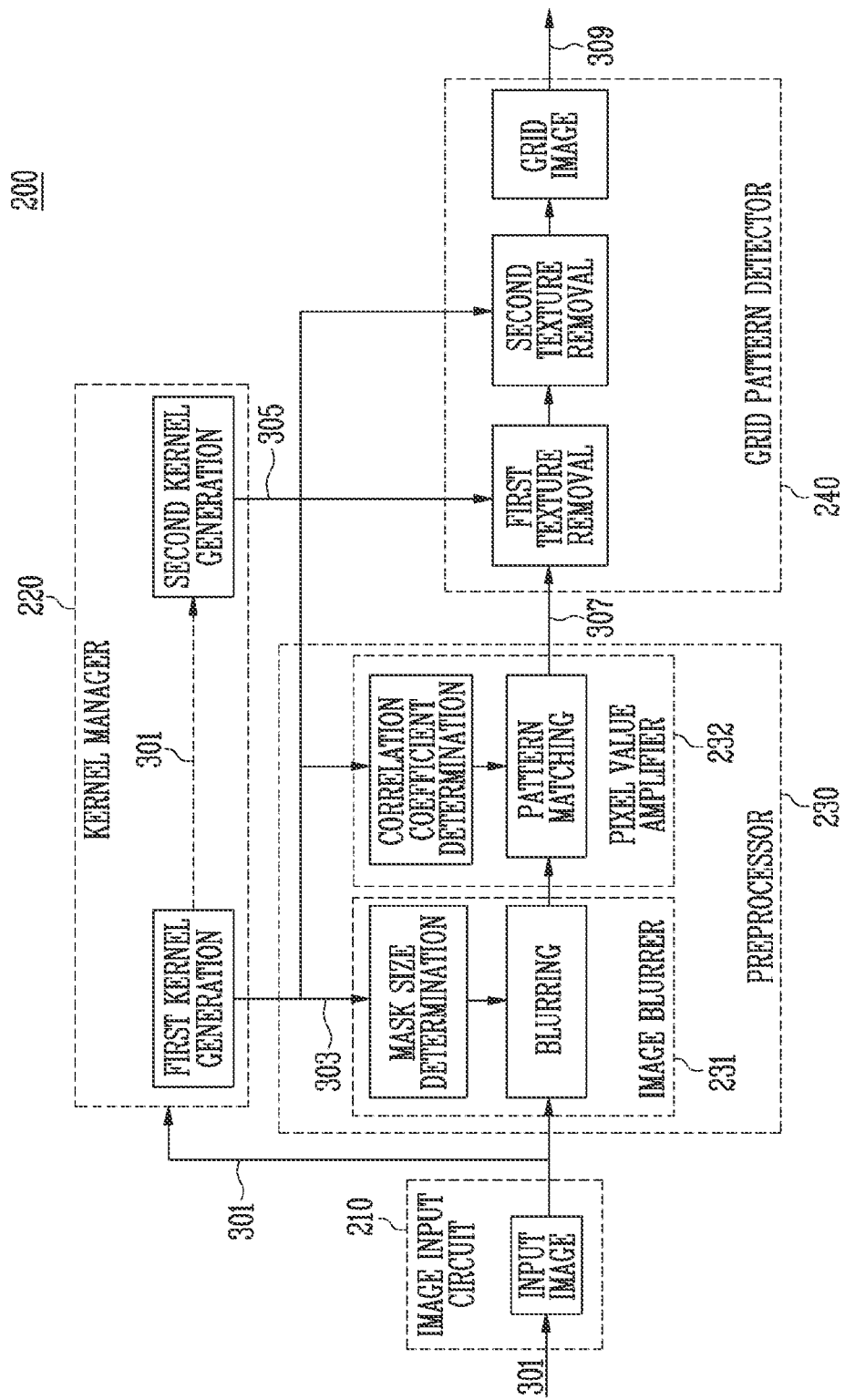
FIG. 3 is a diagram illustrating an image processing device 200 of FIG. 1 according to an embodiment of the present disclosure.

FIG. 3 is a diagram illustrating the image processing device 200 of FIG. 1 according to an embodiment of the present disclosure.

Referring to FIG. 3, the image processing device 200 may detect a grid pattern included in an input image 301. The image processing device 200 may generate a grid image 309 used to determine whether a defect occurs in an image sensor 100 which generates the input image 301.

An image input circuit 210 may receive the input image 301 from an external device or the image sensor 100. The input image 301 may include grid pattern noise. In an embodiment of the present disclosure, the input image 301 may include pixel values.

The kernel manager 220 may receive the input image 301 through the image input circuit 210, and may generate kernels 303, 305 based on the array pattern of the color filter array included in the image sensor 100. The kernel manager 220 may generate a first kernel 303 corresponding to the grid pattern and a second kernel 305 used to remove textures larger than the grid pattern. The first kernel 303 and the second kernel 305 may be used to remove the textures included in the input image 301.

The kernel manager 220 may transfer information about the first kernel to the preprocessor 230. The information about the first kernel 303 may be used to determine the size of a mask used for a blur operation or determine a correlation coefficient related to pattern matching.

The preprocessor 230 may perform a blur operation based on the pixel values and the kernels 303, 305. The preprocessor 230 may amplify pattern pixel values corresponding to a grid pattern, among the pixel values. The preprocessor 230 may include an image blurrer 231 and a pixel value amplifier 232.

The image blurrer 231 may remove normal noise included in the input image 301 by performing a blur operation. The image blurrer 231 may determine the size of a mask used for a blur operation, and may change pixel values along the mask moving in the input image 301. The image blurrer 231 may change the pixel values to correspond to a normal distribution along the mask.

The image blurrer 231 may determine the size of the mask used for the blur operation based on the size of the first kernel 303. For example, a Gaussian mask may be used for the blur operation on the input image, and the size of the Gaussian mask may be determined depending on the first kernel 303.

In an embodiment of the present disclosure, the image blurrer 231 may remove normal noise smaller than the grid pattern included in the input image based on the pixel values of the input image and the first kernel 303. The image blurrer 231 may determine the size of the mask used for the blur operation based on the size of the first kernel 303, and may change pixel values to correspond to a normal distribution along the mask moving in the input image 301.

The image blurrer 231 may determine the size of the mask to be smaller than twice the size of the first kernel by 1, and may perform a Gaussian blur operation on the pixel values using the mask. By means of the Gaussian blur operation using the mask having the size smaller than twice the size of the first kernel by 1, normal noises smaller than the grid pattern corresponding to an N×N array pattern may be removed from the input image 301.

In an embodiment of the present disclosure, the image blurrer 231 may be implemented using a two-dimensional (2D) Gaussian filter. Here, the covariance of the Gaussian filter may be 0.

The pixel value amplifier 232 may amplify pattern pixel values corresponding to the grid pattern, among the pixel values, by performing a pattern matching operation. The pixel value amplifier 232 may determine a correlation coefficient corresponding to the corresponding kernel. The pixel value amplifier 232 may increase the pixel values by adding a compensation value to the pattern pixel values based on the correlation coefficient. The pixel value amplifier 232 may normalize the pixel values to which the compensation value is added to integers falling within a preset range. In an embodiment of the present disclosure, the normalized pixel values may have integer values falling within a range from 0 to 255. The correlation coefficient used for pattern matching may be determined in accordance with the first kernel. In an embodiment of the present disclosure, the pixel value amplifier 232 may add the compensation value determined based on the correlation coefficient to the pattern pixel values. That is, the pattern pixel values may be amplified depending on the first kernel.

The preprocessor 230 may perform a preprocessing operation on the input image. A preprocessed input image 307 obtained by performing the preprocessing operation may be transferred to a grid pattern detector 240. The grid pattern detector 240 may detect a grid pattern based on the preprocessed pixel array 301 from which the normal noise is removed and in which the pixel values corresponding to the grid pattern are amplified.

The grid pattern detector 240 may change pixel values irrelevant, i.e., not relevant, to the grid pattern, among the pixel values, to a preset value based on the first kernel 303 and the second kernel 305 generated by the kernel manager 220. The grid pattern detector 240 may generate a grid image 309 including only the grid pattern. The grid pattern detector 240 may remove first textures, which are textures larger than the grid pattern, and second textures, which are textures other than the grid pattern (i.e., non-grid pattern textures), from the input image 301.

In an embodiment of the present disclosure, the detected grid pattern may be grid pattern noise occurring due to the pixel features of the image sensor 100. When the size of pixels included in the image sensor is reduced, a channel branching phenomenon may occur due to light scattering or interference. As the size of pixels is smaller, light scattering or interference may be more severe. The image processing system 10 may determine the image sensor 100 to be defective in response to the case where the grid pattern is detected in the sensed image 301. The image processing system 10 may determine whether the image sensor 100 is defective without a separate test for determining defectiveness. The grid pattern detector 240 may detect a grid pattern included in the image using the first kernel 303 and the second kernel 305. In detail, the grid pattern detector 240 may remove textures larger than the grid pattern from the image based on the second kernel 305. The grid pattern detector 240 may perform a grid pattern detection operation of removing textures other than the grid pattern based on the first kernel. The grid pattern detector 240 may generate a grid image 309 from which textures except for the grid pattern are removed, and may output the grid image 309. The grid pattern detector 240 may determine whether a grid pattern is detected based on the grid image 309 obtained by performing the grid pattern detection operation.

The grid pattern detector 240 may apply the second kernel 305 to the preprocessed pixel array 301. The grid pattern detector 240 may detect a grid pattern by applying the first kernel to the pixel array 301 to which the second kernel 305 is applied. The grid pattern detector 240 may perform the grid pattern detection operation of first applying the second kernel to the pixel array 301 and applying the first kernel to the image, to which the second kernel is applied, multiple times.

The grid pattern detector 240 may set the number of times that the grid pattern detection operation is to be performed based on at least one of the N×N array pattern of the color filter array or detection strength. The grid pattern detector 240 may perform the grid pattern detection operation a set number of times.

The second kernel may be used to remove textures larger than the grid pattern from the textures included in the image. When the second kernel is applied to the image, the sizes of the textures included in the image may be decreased. The textures included in the image to which the second kernel is applied may be gradually decreased from an outer portion of the image. When the second kernel is repeatedly applied to the image, the sizes of the textures included in the image may be stepwise decreased.

The first kernel may be used to remove textures irrelevant to the grid pattern from the textures included in the image. When the first kernel is applied to the image, only the grid pattern may remain in the corresponding image. When the first kernel is applied to the image to which the second kernel is applied, textures other than the grid pattern may be removed. When the grid pattern detection operation of applying the second kernel and the first kernel to the image is repeatedly performed on a specific image, all textures except for the grid pattern detected by the first kernel may be removed, and an image including only the grid pattern may be finally generated.

Because the first kernel is generated based on the N×N array pattern of the color filter array, the grid pattern detected by the first kernel may be grid pattern noise occurring due to the pixel features of the image sensor. An image sensor which outputs image data including grid pattern noise detected by the first kernel may be determined to be defective.

Figure 4:
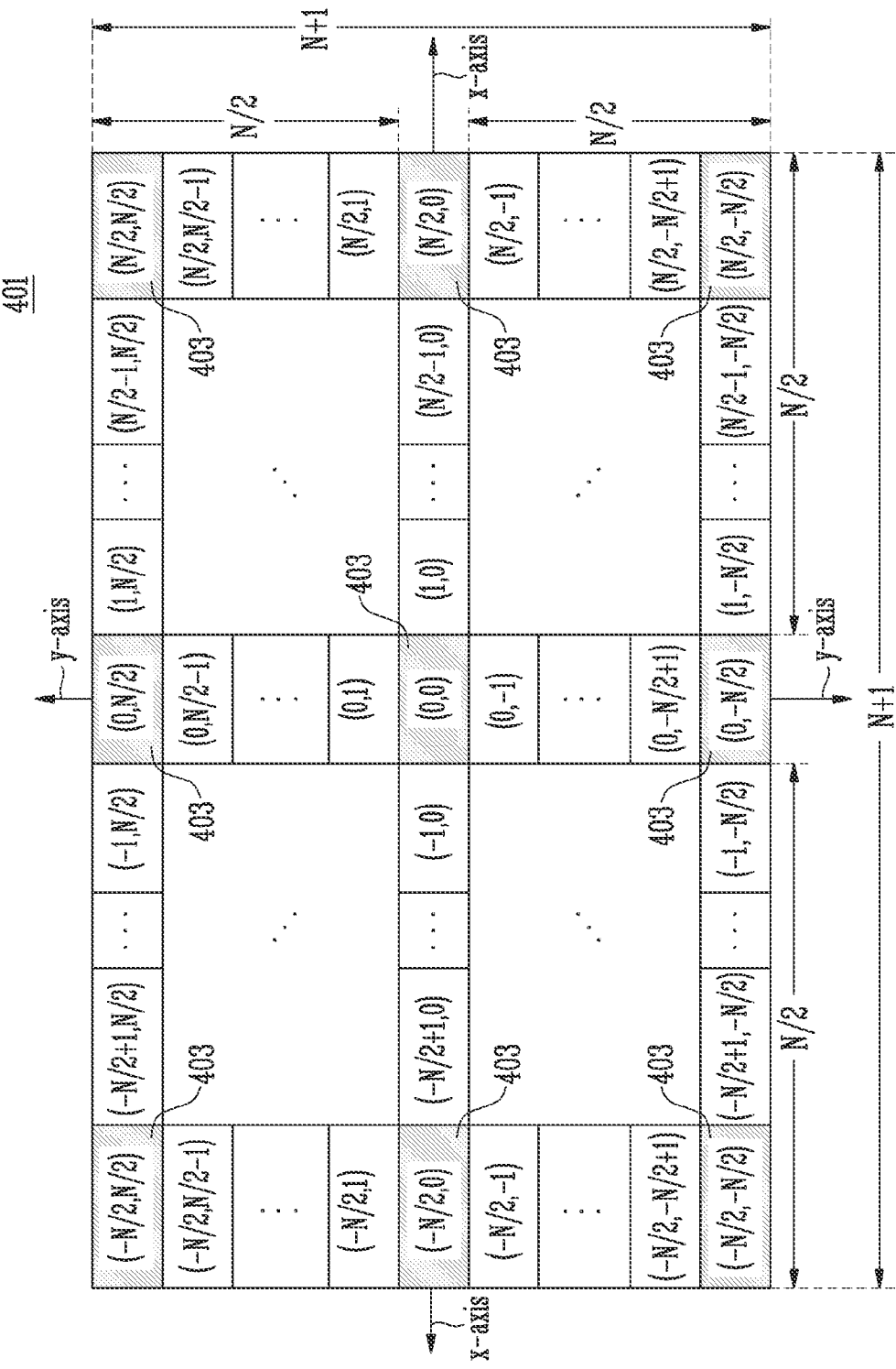
FIG. 4 is a diagram illustrating a first kernel corresponding to an array pattern of a color filter array according to an embodiment of the present disclosure.

FIG. 4 is a diagram illustrating a first kernel 401 corresponding to an array pattern of a color filter array according to an embodiment of the present disclosure.

A kernel manager 220 may generate the first kernel 401 which detects a grid pattern produced due to pixel features, among textures included in an image. The first kernel 401 generated by the kernel manager 220 may have a size of (N+1)×(N+1). The first kernel 401 having the size of (N+1)×(N+1) may have a value of 1 only at nine positions 403 regardless of the size of the first kernal 401. All of the values of the first kernel 401 corresponding to the remaining positions may be 0. In FIG. 4, the first kernel 401 may have a value of 1 at the positions indicated by shading 403. The size of the first kernel 401 may be determined to correspond to the N×N array pattern of the color filter array. In an embodiment of the present disclosure, the first kernel 401 may have a value of 1 at the central position (0, 0) and positions (0, N/2), (0, −N/2), (N/2, 0), (N/2, N/2), (N/2, −N/2), (−N/2, 0), (−N/2, N/2), and (−N/2, −N/2) of the first kernel 401. The first kernel 401 may have a value of 0 at the remaining positions.

In an embodiment of the present disclosure, the first kernel 401 may have a value of 1 at the central position, the x,y coordinates of which are (0,0) both ends of an x-axis direction with respect to the central position, both ends of a y-axis direction with respect to the central position, and ends of diagonal directions with respect to the central position. The first kernel may have a value of 0 at the remaining positions.

In accordance with an embodiment of the present disclosure, the grid pattern detector 240 may detect a grid pattern corresponding to the x-axis direction, the y-axis direction or the diagonal directions by applying the first kernel to the image. The shape of the first kernel 401 depicted in FIG. 4 is only an example. The shape of the first kernel 401 is therefore not limited to that illustrated in FIG. 4. The first kernel may have any shape as long as the kernel's shape enables a grid pattern to be detected with respect to the x-axis direction, the y-axis direction or the diagonal directions.

As the size of the first kernel 401 increases, the distance between positions having a value of 1 may be longer. And, as the size of the first kernel increases, the size of the detected grid pattern may be larger. In an embodiment of the present disclosure, as the size of the array pattern of the color filter array is made larger, the size of the grid pattern produced due to the pixel features may be correspondingly larger.

The first kernel may be used to remove textures irrelevant to the grid pattern from the textures included in the image. When the first kernel is applied to the image, only the grid pattern may finally remain in the corresponding image. Because the first kernel is generated based on the N×N array pattern of the color filter array, the grid pattern detected by the first kernel may be grid pattern noise occurring due to the pixel features of the image sensor. When the first kernel is repeatedly applied to the image, a grid image 309 including only the grid pattern may be generated.

Figures 5, 6:
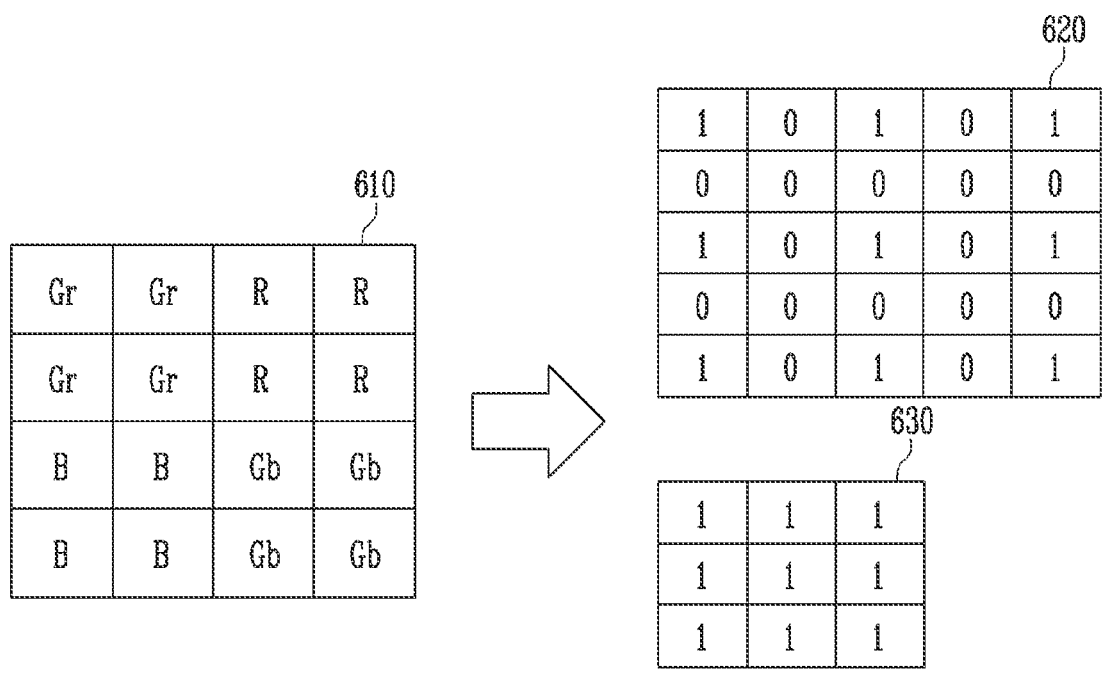
FIG. 5 is a diagram illustrating a second kernel corresponding to an array pattern of a color filter array according to an embodiment of the present disclosure.
FIG. 6 is a diagram illustrating a first kernel and a second kernel corresponding to a quad-Bayer pattern according to an embodiment of the present disclosure.

FIG. 5 is a diagram illustrating a second kernel 501 corresponding to an array pattern of a color filter array according to an embodiment of the present disclosure.

Referring to FIG. 5, the kernel manager 220 may generate the second kernel 501 having a value of 1 at all positions and having a size of (N/2+1)×(N/2+1). The second kernel 501 may correspond to a grid pattern determined based on the N×N array pattern of the color filter array 110. In an embodiment of the present disclosure, the second kernel 501 may be used to remove textures larger than the grid pattern.

The second kernel 501 having a size of (N/2+1)×(N/2+1) may have a value of 1 at all positions. The size of the second kernel may always be smaller than that of the first kernel.

The size of the second kernel 501 may be determined in accordance with the N×N array pattern of the color filter array 110. The kernel manager 220 may generate a second kernel which removes textures larger than the grid pattern produced due to pixel features, among textures included in an image.

The second kernel may be used to remove textures larger than the grid pattern from the textures included in the image. When the second kernel 501 is applied to the image, the sizes of the textures included in the image may be decreased. When the second kernel 501 is repeatedly applied to the image, the sizes of the textures included in the image may be stepwise decreased, i.e., decreased in increments.

The sizes of the textures included in the image may be gradually decreased by the second kernel. The textures included in the image to which the second kernel is applied may be gradually decreased from an outer portion of the image. In an embodiment of the present disclosure, the first kernel may be applied to the image to which the second kernel is applied. Although the second kernel does not directly detect the grid pattern, it may preprocess the textures included in the image so that the grid pattern is detected by the first kernel.

FIG. 6 is a diagram illustrating a first kernel and a second kernel corresponding to a quad-Bayer pattern according to an embodiment of the present disclosure.

Referring to FIG. 6, a color filter array included in an image sensor may have a form in which a quad-Bayer pattern 610 is repeated. The quad-Bayer pattern 610 may be composed of 4×4 color filters. In the quad-Bayer pattern 610, eight green color filters Gb and Gr may be arranged to diagonally opposite each other, and four blue color filters B and four red color filters R may be arranged at the remaining corners. In an embodiment of the present disclosure, the size of a first kernel 620 corresponding to the quad-Bayer pattern 610 may be 5×5. The size of the second kernel 630 corresponding to the quad-Bayer pattern 610 may be 3×3.

In an embodiment of the present disclosure, the first kernel 620 may be used to detect a grid pattern corresponding to an x-axis direction, a y-axis direction, or diagonal directions included in the image. A value of 1 may be assigned only to positions corresponding to the origin of the first kernel 620, end points of the x-axis and y-axis directions, and end points of the diagonal directions. When the first kernel 620 is applied to the image, textures other than a grid pattern having a size of 2×2 may be removed.

The second kernel 630 may reduce the sizes of textures included in the image. The textures included in the image to which the second kernel 630 is applied may be gradually decreased from an outer portion of the image. When the second kernel 630 is applied to the image, the sizes of the textures included in the image may be decreased by 1 pixel. The second kernel 630 may be finally used to remove textures having sizes larger than the 2×2 size.

Figure 7:
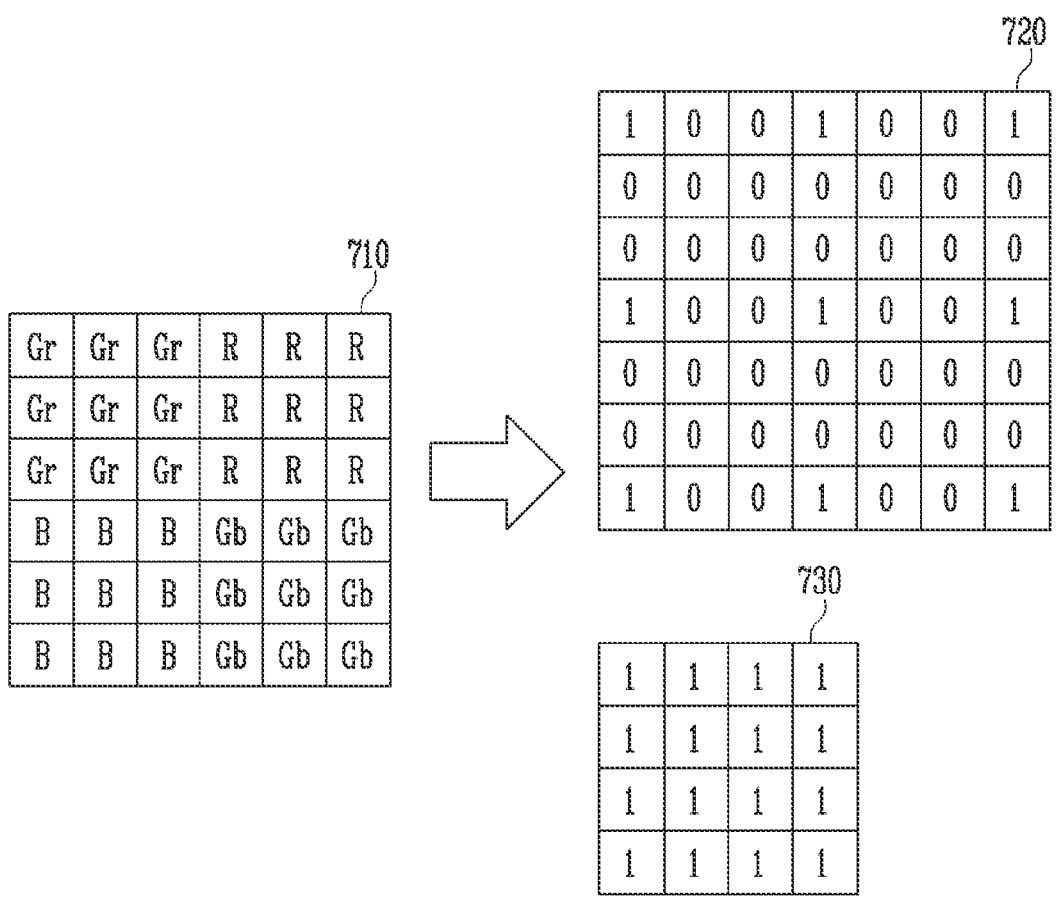
FIG. 7 is a diagram illustrating a first kernel and a second kernel corresponding to a Nona-cell pattern according to an embodiment of the present disclosure.

FIG. 7 is a diagram illustrating a first kernel and a second kernel corresponding to a Nona-cell pattern according to an embodiment of the present disclosure.

Referring to FIG. 7, a color filter array included in an image sensor may have a form in which a Nona-cell pattern 710 is repeated. The Nona-cell pattern 710 may be composed of 6×6 color filters. In the Nona-cell pattern 710, 18 green color filters Gb and Gr may be arranged to diagonally opposite each other, and nine blue color filters B and nine red color filters R may be arranged at the remaining corners.

In FIG. 7, a first kernel 720 having a size of 7×7 and a second kernel 730 having a size of 4×4, which correspond to the Nona-cell pattern 710 of the color filter array, may be illustrated. Descriptions of the first kernel 720 and the second kernel 730 may correspond to those of the first kernel 620 and the second kernel 630 in FIG. 6, except that the sizes of the kernels are different from each other. That is, the first kernel 720 may be used to remove textures other than a grid pattern having a size of 3×3, and the second kernel 730 may be used to remove textures having sizes larger than the 3×3 size.

Figure 8:
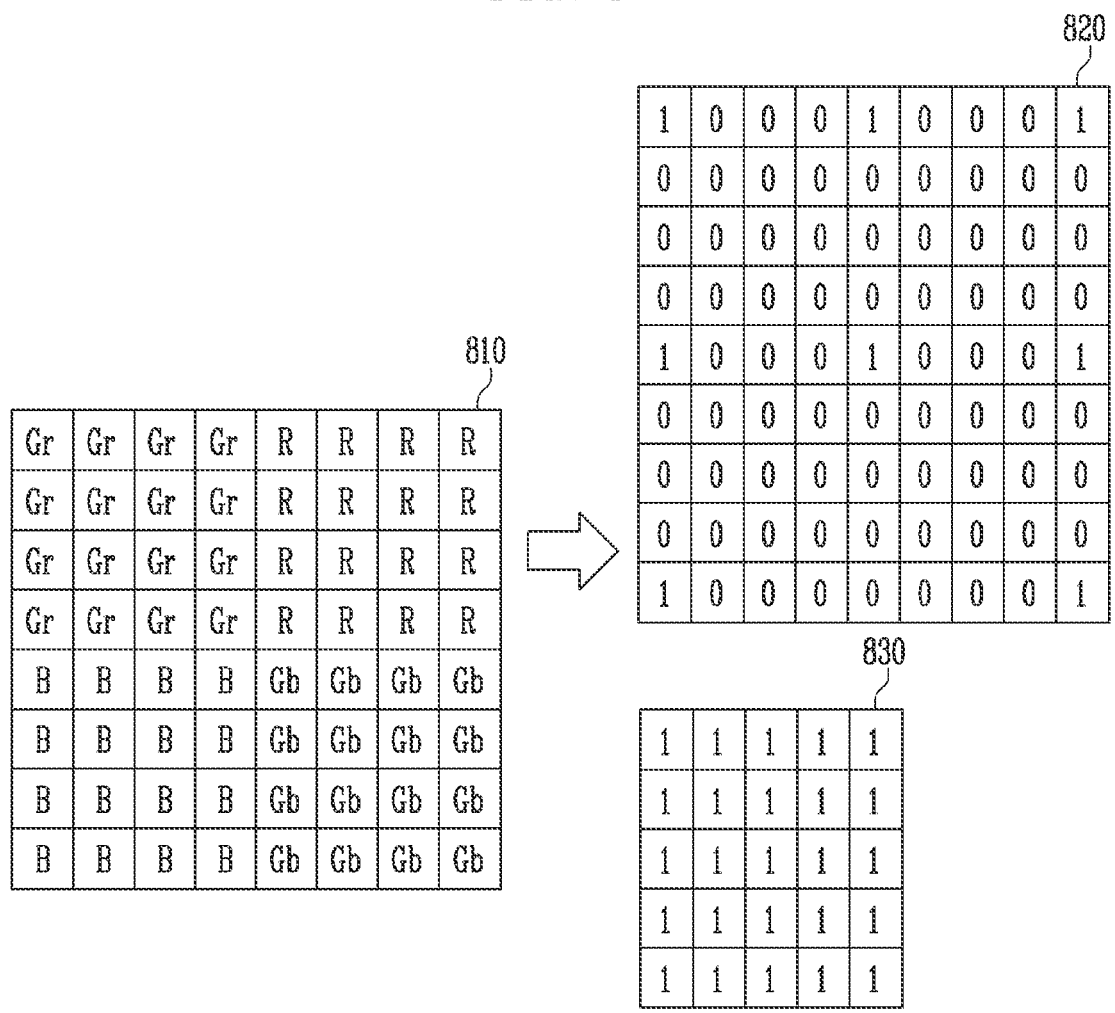
FIG. 8 is a diagram illustrating a first kernel and a second kernel corresponding to a hexa-deca pattern according to an embodiment of the present disclosure.

FIG. 8 is a diagram illustrating a first kernel and a second kernel corresponding to a hexa-deca pattern according to an embodiment of the present disclosure.

Referring to FIG. 8, a color filter array included in an image sensor may have a form in which a hexa-deca pattern 810 is repeated. The hexa-deca pattern 810 may be implemented as a repetition of 8×8 color filters. In the hexa-deca pattern 810, 32 green color filters Gb and Gr may be arranged to diagonally opposite each other, and 16 blue color filters B and 16 red color filters R may be arranged at the remaining corners.

In FIG. 8, a first kernel 820 having a size of 9×9 and a second kernel 830 having a size of 5×5, which correspond to the hexa-deca pattern 810 of the color filter array, may be illustrated. Similar to FIG. 7, descriptions of the first kernel 820 and the second kernel 830 may correspond to those of the first kernel 620 and the second kernel 630 in FIG. 6, except that the sizes of the kernels are different from each other. That is, the first kernel 820 may be used to remove textures other than a grid pattern having a size of 4×4, and the second kernel 830 may be used to remove textures having sizes larger than the 4×4 size.

Figure 9:
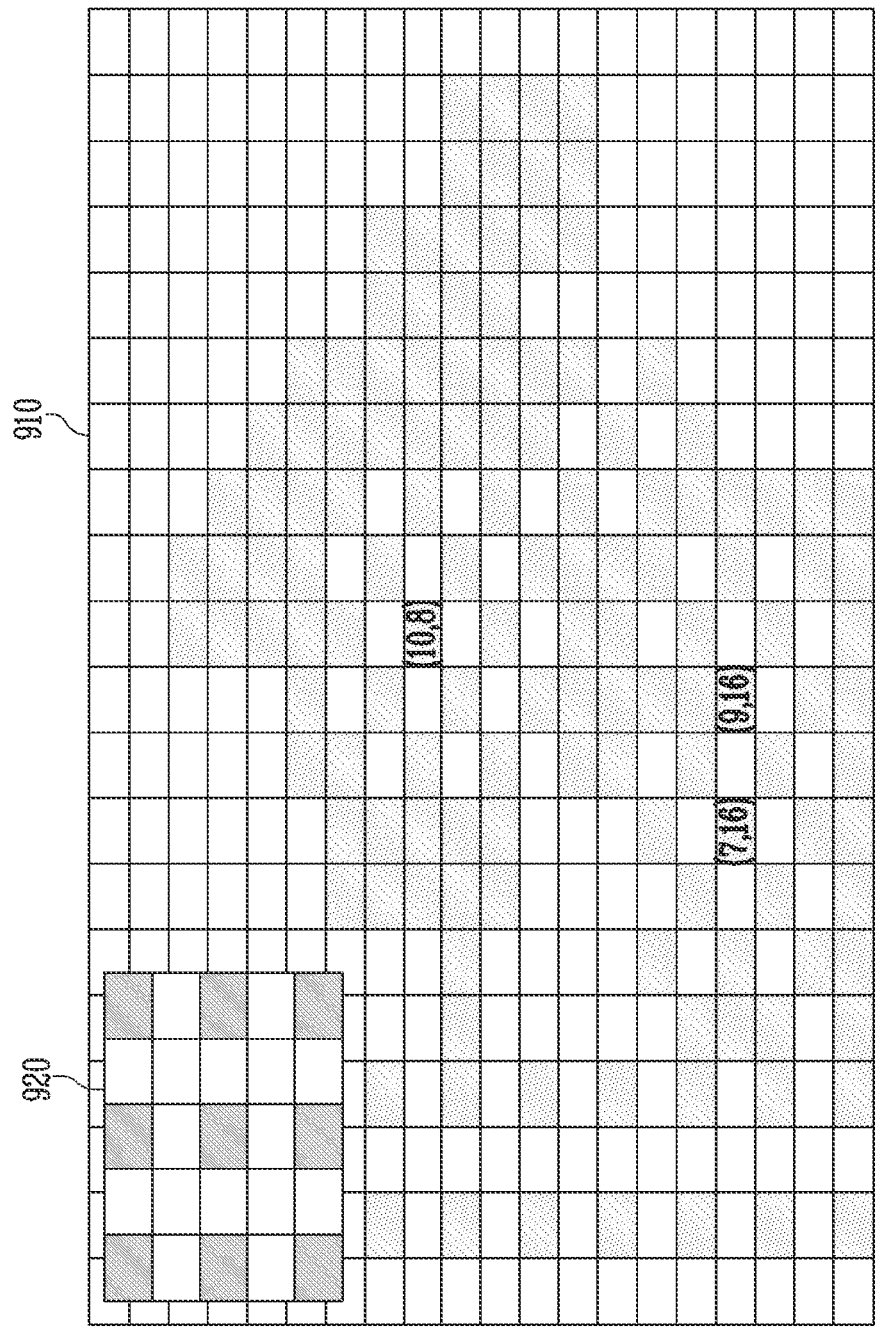
FIG. 9 is a diagram illustrating a method of detecting a grid pattern using kernels according to an embodiment of the present disclosure.

FIG. 9 is a diagram illustrating a method of detecting a grid pattern using kernels according to an embodiment of the present disclosure.

Referring to FIG. 9, a kernel 920 may be applied to an input image 910. The kernel 920 may be moved within the input image 910. The kernel 920 may be applied to the input image 910 along the moving kernel 920.

In FIG. 9, it may be assumed that the kernel 920 is a kernel corresponding to the case where the array pattern of a color filter array included in the image sensor is a quad-Bayer pattern. The kernel 920 may be a first kernel corresponding to the quad-Bayer pattern.

When shaded portions of the kernel 920 match shaded portions of the input image 910, a pixel value may be maintained at the position of the input image 910 corresponding to the origin of the kernel 920. When shaded portions of the kernel 920 do not match shaded portions of the input image 910, a pixel value may be 0 at the position of the input image 910 corresponding to the origin of the kernel 920.

In FIG. 9, positions of the input image 910, at which the shaded portions of the input image 910 match the shaded portions of the kernel 920, may be (7, 16), (9, 16), and (10, 8). When the kernel 920 is applied to the input image 910, a grid image in which pixel values are maintained only at positions (7,16), (9,16), and (10, 8) and in which pixel values at the remaining positions are 0 may be generated.

Figure 10:
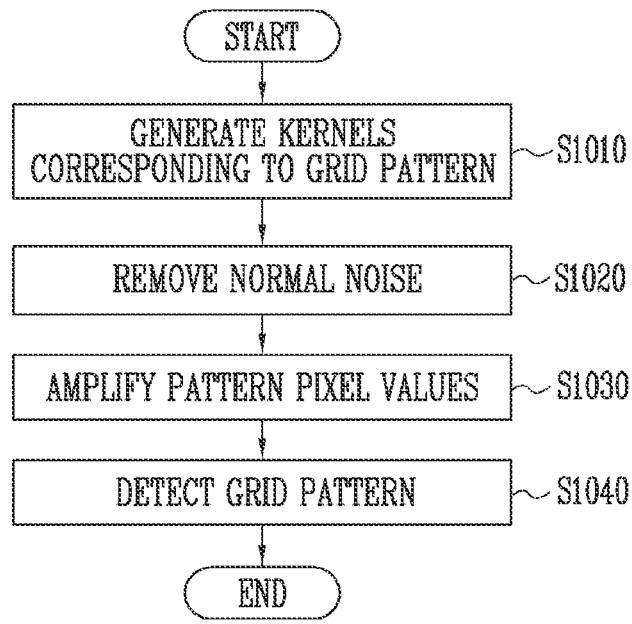
FIG. 10 is a flowchart illustrating a method of detecting a grid pattern according to an embodiment of the present disclosure.

FIG. 10 is a flowchart illustrating a method of detecting a grid pattern according to an embodiment of the present disclosure.

Referring to FIG. 10, an image processing device may detect a grid pattern produced depending on the array pattern of a color filter array. The image processing device may remove normal noise included in an input image, and may generate a grid image including only a grid pattern using kernels corresponding to the grid pattern.

At step S1010, a kernel manager may generate kernels corresponding to the grid pattern determined based on an N×N array pattern of the color filter array included in an image sensor. The kernel manager may generate a first kernel and a second kernel, which correspond to the N×N array pattern of the color filter array and have different kernel sizes.

The size of the first kernel generated by the kernel manager may be (N+1)×(N+1), and the shape of the first kernel may correspond to a grid pattern. In an embodiment of the present disclosure, the first kernel may have a value of 1 at preset positions and a value of 0 at the remaining positions.

The kernel manager may generate a second kernel having a value of 1 at all positions and having a size of (N/2+1)× (N/2+1). The second kernel may correspond to the grid pattern determined based on the N×N array pattern of the color filter array. In an embodiment of the present disclosure, the second kernel may be used to remove textures larger than the grid pattern.

At step S1020, an image blurrer may remove normal noise smaller than the grid pattern included in the input image based on externally received pixel values and the kernels. The image blurrer may remove normal noise smaller than the grid pattern from the input image by performing a blur operation.

The image blurrer may determine the size of a mask used for the blur operation based on the size of the first kernel, and may change pixel values to correspond to a normal distribution along the mask moving in the input image. In detail, the image blurrer may determine the size of the mask to be smaller than twice the size of the first kernel by 1, and may perform a Gaussian blur operation on the pixel values using the mask. Normal noises smaller than the grid pattern may be removed from the input image through the Gaussian blur operation.

At step S1030, a pixel value amplifier may amplify pattern pixel values corresponding to the grid pattern, among the pixel values. The grid pattern and noise, other than the grid pattern, may be distinctly distinguished from each other in the image through a pattern matching operation performed by the pixel value amplifier.

In an embodiment of the present disclosure, the pixel value amplifier may determine a correlation coefficient corresponding to the first kernel. The pixel value amplifier may add a compensation value determined based on the correlation coefficient to the pattern pixel values. The correlation coefficient for amplifying the pattern pixel values may be determined depending on the first kernel.

At step S1040, a grid pattern detector may remove textures irrelevant to the grid pattern included in the input image based on the kernels. The grid pattern detector may generate a grid image 309 including only the grid pattern, and may then detect a grid pattern included in the input image.

The grid pattern detector may remove textures larger than the grid pattern included in the image using the second kernel, and may remove textures irrelevant to the grid pattern from the image using the first kernel. Noises other than the grid pattern may be removed from the input image.

In an embodiment of the present disclosure, the grid pattern detector may set the number of times that the grid pattern detection operation is to be performed based on at least one of the input image, the N×N array pattern of the color filter array, or detection strength. The grid pattern detector may perform the grid pattern detection operation of first applying the second kernel to the input image and applying the first kernel to the image, to which the second kernel is applied, multiple times.

Figure 11:
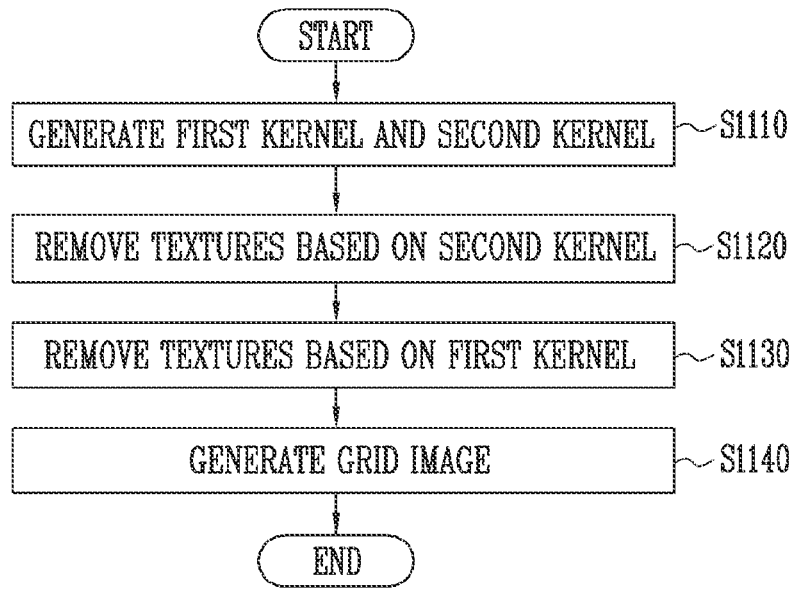
FIG. 11 is a flowchart illustrating a method of generating a grid image according to an embodiment of the present disclosure.

FIG. 11 is a flowchart illustrating a method of generating a grid image according to an embodiment of the present disclosure.

Referring to FIG. 11, a kernel manager may generate kernels corresponding to the array pattern of a color filter array. A grid pattern detector may remove textures irrelevant to a grid pattern included in an input image using the generated kernels. In accordance with an embodiment of the present disclosure, a grid image including only the grid pattern may be finally generated. When a grid image is not generated, an image sensor may not be defective.

At step S1110, the kernel manager may generate a first kernel and a second kernel, which correspond to the N×N array pattern of the color filter array. The sizes of the first kernel and the second kernel may be different from each other.

The kernel manager may generate a first kernel having a size of (N+1)×(N+1) based on the N×N array pattern of the color filter array. The first kernel may have a value of 1 at the central position of the first kernel and positions corresponding to both ends of an x-axis direction with respect to the central position, both ends of a y-axis direction with respect to the central position, and ends of diagonal directions with respect to the central position. All of the values of the first kernel corresponding to the remaining positions may be 0.

The kernel manager may generate a second kernel having a value of 1 at all positions and having a size of (N/2+1)×(N/2+1). The second kernel may be used to remove textures larger than the grid pattern included in the N×N array pattern.

At step S1120, the grid pattern detector may remove textures larger than the grid pattern from the input image based on the second kernel. The second kernel may be applied to a preprocessed image. A preprocessing operation may include an operation of removing normal noise from the input image and amplifying pixel values.

When the second kernel is applied to the image, the sizes of the textures included in the image may be decreased. The textures included in the image to which the second kernel is applied may be gradually decreased from an outer portion of the image. When the second kernel is repeatedly applied to the image, the sizes of the textures included in the image may be stepwise decreased.

In an embodiment of the present disclosure, the first kernel may be applied to the image to which the second kernel is applied. The grid pattern detector does not directly detect a grid pattern using the second kernel, but may first apply the second kernel to the image so that the grid pattern is detected by the first kernel.

At step S1130, the grid pattern detector may remove textures other than the grid pattern based on the first kernel. When the first kernel is applied to the image, only the grid pattern may remain in the corresponding image. Because the first kernel is generated based on the N×N array pattern of the color filter array, the grid pattern detected by the first kernel may be grid pattern noise occurring due to the pixel features of the image sensor.

At step S1140, the grid pattern detector may generate a grid image including only the grid pattern. When the first kernel is repeatedly applied to the image, a grid image including only the grid pattern may be generated. The grid pattern detector may determine whether a grid pattern is detected based on the grid image obtained by performing the grid pattern detection operation.

When the grid image is generated, the grid pattern detector may determine that the corresponding image sensor is defective. On the other hand, when no grid image is generated, the grid pattern detector may determine that the corresponding image sensor is not defective.

Figure 12:
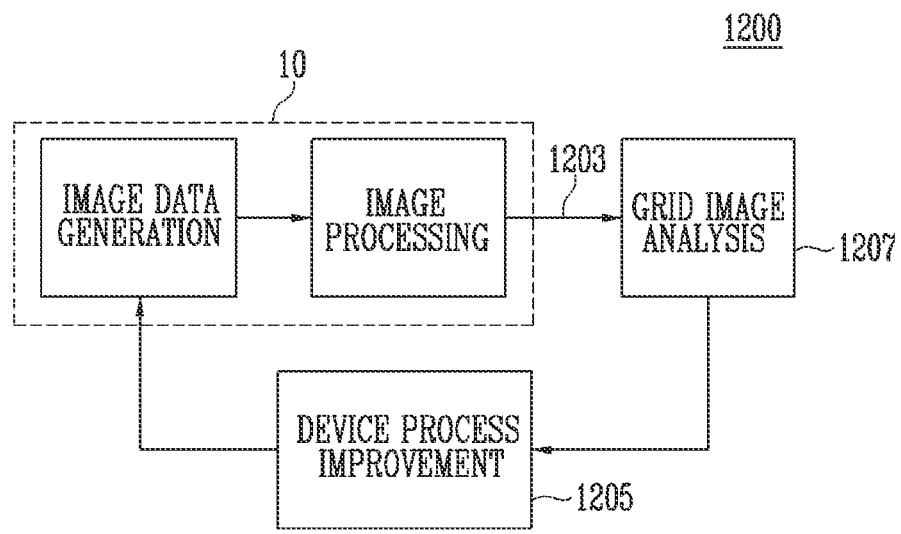
FIG. 12 is a diagram illustrating a method of improving a device process using an image processing system according to an embodiment of the present disclosure.

FIG. 12 is a diagram illustrating a method 1200 of improving a device process using an image processing system 10 according to an embodiment of the present disclosure.

Referring to FIG. 12, an image processing system 10 may generate a grid image 1203, and may improve a device process 1205 based on the generated grid image 1203. The grid image 1203 may include grid pattern noise produced due to pixel features of an image sensor, not shown in FIG. 12. An evaluation system 1207 may quantitatively analyze the grid image, and may then detect whether a defect occurs in the image sensor.

The image processing system 10 may receive light 101 from an external system, and may generate image data. The received light 101 may reach pixels included in the image sensor (not shown), and may be converted into the image data. As the sizes of the pixels included in the image sensor are smaller, light interference occurs, whereby grid pattern noise may be included in the image data.

In an embodiment of the present disclosure, the image processing system 10 may perform a preprocessing operation of removing normal noise from the image data and amplifying the grid pattern. The image processing system 10 may generate a grid image 1203 including only the grid pattern by applying the first kernel and the second kernel to the image data on which the preprocessing operation is performed.

The evaluation system 1207 may analyze the grid image 1203 generated by the image processing system 10. The evaluation system may quantitatively analyze the position and the size of grid pattern noise included in the grid image. The evaluation system 1207 may detect defects in a device process related to the image sensor based on the result of the analysis.

The evaluation system 1207 may improve the device process based on the result of the detection. The device process to be improved may vary depending on the position and size of the grid pattern noise included in the grid image. A grid image generation process may be repeated using an image processing system including an image sensor produced through the improved device process. A device production process may be improved by repeating the generation of a grid image and the analysis of the grid image.

Figure 13:
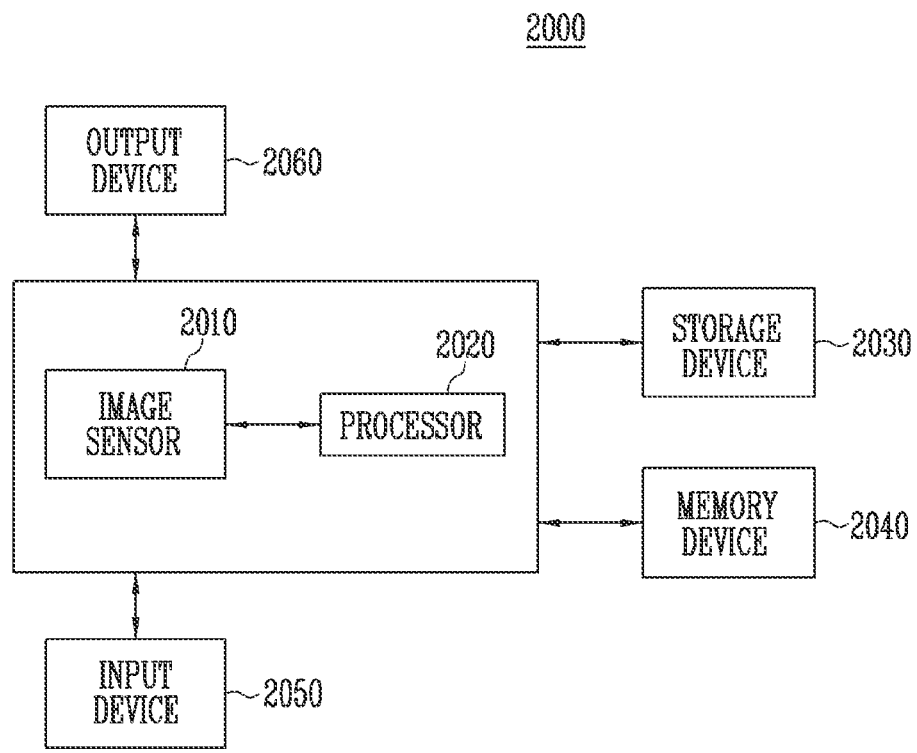
FIG. 13 is a block diagram illustrating an electronic device including an image processing system according to an embodiment of the present disclosure.

FIG. 13 is a block diagram illustrating an electronic device including an image processing system according to an embodiment of the present disclosure.

Referring to FIG. 13, an electronic device 2000 may include an image sensor 2010, a processor 2020, a storage device 2030, a memory device 2040, an input device 2050, and an output device 2060. Although not illustrated in FIG. 13, the electronic device 2000 may further include ports which are capable of communicating with a video card, a sound card, a memory card, or a universal serial bus (USB) device, or communicate with other electronic devices.

The image sensor 2010, preferably embodied as a CMOS image sensor, may generate image data corresponding to light 101 passing through a color filter array. The arrangement of the color filter array included in the image sensor 2010 may be variously implemented. The output device 2060 may display the image data. The storage device 2030 may store the image data. The processor 2020 may control the operations of the image sensor 2010, the storage device 2030, and the output device 2060.

The processor 2020 and its program instructions, may perform specific calculations or tasks, specifically including the tasks and operations described above, the method steps depicted in FIGS. 10 and 11, as well as the tasks and operations recited in the appurtenant claims. The processor 2020 may thus execute various program instructions, to control the operation of the electronic device 2000. In accordance with an embodiment of the present disclosure, the processor 2020 may be a microprocessor, a central processing unit (CPU), or an application processor (AP) or in some alternate embodiments, a plurality of such devices.

The processor 2020 may be implemented as a chip, physically separate from and independent of the image sensor 2010. For example, the processor 2020 and image sensor 2010 may be implemented as a multi-chip package with the processor 2020 residing on a first chip and the image sensor 2010 residing on a second and different chip. In an embodiment of the present disclosure, both the processor 2020 and the image sensor 2010 may be integrated into a single chip so that the processor 2020 is included as a part of the image sensor 2010.

The processor 2020 may be coupled to the storage device 2030, the memory device 2040, the input device 2050, and the output device 2060 through an address bus, a control bus, and a data bus, and may thereby communicate with the devices. In accordance with an embodiment of the present disclosure, the processor 2020 may also be coupled to an expansion bus such as a peripheral component interconnect (PCI) bus.

In an embodiment of the present disclosure, the processor 2020 may generate kernels based on the array pattern of the color filter array. The processor 2020 may detect a grid pattern included in a sensed image using the generated kernels. The processor 2020 may perform a blur operation on the sensed image based on the kernels, and may amplify pattern pixel values corresponding to the grid pattern, among pixel values. The processor 2020 may remove textures irrelevant to the grid pattern from the sensed image, and may generate a grid image including only the grid pattern. The detected grid pattern may be produced due to a channel branching phenomenon caused by light scattering or interference attributable to pixels included in the image sensor 2010.

In an embodiment of the present disclosure, the processor 2020 may generate a grid image in accordance with the image sensor 2010 which is defective. When the image sensor 2010 is normal, the processor 2020 may not generate a grid image.

The storage device 2030 may include all types of non-volatile memory devices including a flash memory device, a solid state drive (SSD), a hard disk drive (HDD), and a CD-ROM.

The memory device 2040 may store data required for the operation of the electronic device 2000. For example, the memory device 2040 may include a volatile memory device such as a dynamic random access memory (DRAM) or a static random access memory (SRAM), and a nonvolatile memory device such as an erasable programmable read-only memory (EPROM), an electrically erasable programmable read-only memory (EEPROM), or a flash memory device. The processor 2020 may control the image sensor 2010 and the output device 2060 by executing an instruction set stored in the memory device 2040.

The input device 2050 may include a keyboard, a keypad, or a mouse. The output device 2060 may include an output means such as a printer or a display.

The image sensor 2010 may be implemented as various types of packages. For example, at least some components of the image sensor 2010 may be implemented using any of packages such as package on package (POP), ball grid arrays (BGAs), chip scale packages (CSPs), plastic leaded chip carrier (PLCC), plastic dual in line package (PDIP), die in waffle pack, die in wafer form, chip on board (COB), ceramic dual in line package (CERDIP), plastic metric quad flat pack (MQFP), thin quad flatpack (TQFP), small outline integrated circuit (SOIC), shrink small outline package (SSOP), thin small outline package (TSOP), system in package (SIP), multi-chip package (MCP), wafer-level fabricated package (WFP), and wafer-level processed stack package (WSP).

The electronic device 2000 may be construed as including any of all computing systems using the image sensor 2010. The electronic device 2000 may be implemented in the form of a packaged module, a part or the like. For example, the electronic device 2000 may be implemented as a digital camera, a mobile device, a smartphone, a personal computer (PC), a tablet PC, a notebook computer, a personal digital assistant (PDA), an enterprise digital assistant (EDA), a portable multimedia player (PMP), a wearable device, a black box, a robot, an autonomous vehicle, or the like.

In accordance with the present disclosure, there may be provided an image processing system 10 capable of detecting and reducing grid pattern noise, which may occur due to pixel counts and pixel features of an image sensor, using pixel values of a single image.

It should be noted that the scope of the present disclosure is defined by the accompanying claims, rather than by the foregoing detailed descriptions, and all changes or modifications derived from the meaning and scope of the claims and equivalents thereof are included in the scope of the present disclosure.

What is claimed is:

1. An image processing device, comprising:
   an image input circuit configured to receive pixel values from an image sensor;

a kernel manager configured to generate kernels corresponding to a grid pattern determined based on a N×N array pattern of a color filter array included in the image sensor;

a preprocessor configured to perform a blur operation on received pixel values and the kernels and to amplify pattern pixel values corresponding to the grid pattern, among the received pixel values; and a grid pattern detector configured to change received pixel values, not relevant to the grid pattern to a preset value based on the kernels and to generate a grid image including only the grid pattern.

2. The image processing device according to claim 1, wherein:
the kernel manager is configured to generate a first kernel having a size of (N+1)×(N+1),
the first kernel having a value of 1 at a central position (0, 0) and positions (0, N/2), (0, −N/2), (N/2, 0), (N/2, N/2), (N/2, −N/2), (−N/2, 0), (−N/2, N/2), and (−N/2, −N/2) of the first kernel, and having a value of 0 at remaining positions, and
wherein the preprocessor comprises an image blurrer configured to determine a size of a mask used for the blur operation based on the size of the first kernel and to change the pixel values to correspond to a normal distribution along the mask moving in an image.

3. The image processing device according to claim 2, wherein the image blurrer is configured to determine the size of the mask to be smaller than twice the size of the first kernel by 1, and perform a Gaussian blur operation on the pixel values using the mask.

4. The image processing device according to claim 2, wherein the preprocessor further comprises:
a pixel value amplifier configured to determine a correlation coefficient corresponding to the first kernel and to amplify the pattern pixel values based on the correlation coefficient.

5. The image processing device according to claim 4, wherein the pixel value amplifier is configured to normalize amplified pixel values to integers falling within a preset range.

6. The image processing device according to claim 4, wherein:
the kernel manager is configured to generate a second kernel having a value of 1 at all positions and having a size of (N/2+1)×(N/2+1), and
the grid pattern detector is configured to remove textures larger than the grid pattern based on the second kernel.

7. The image processing device according to claim 6, wherein the grid pattern detector is configured to perform a grid pattern detection operation of removing textures other than the grid pattern based on the first kernel, and determine whether the grid pattern is detected based on the grid image obtained by performing the grid pattern detection operation.

8. The image processing device according to claim 7, wherein the grid pattern detector is configured to set a number of times that the grid pattern detection operation is to be performed based on at least one of an input image, the N×N array pattern of the color filter array, or a detection strength, and perform the grid pattern detection operation a set number of times.

9. An image processing system, comprising:
an image sensor configured to generate pixel values corresponding to an input image based on light passing through a color filter array;

a kernel manager configured to generate kernels corresponding to a grid pattern determined based on an N×N array pattern of the color filter array;

an image blurrer configured to remove normal noise smaller than the grid pattern included in the input image based on the pixel values and the kernels;

a pixel value amplifier configured to amplify pattern pixel values corresponding to the grid pattern, among the pixel values; and a grid pattern detector configured to remove textures that are irrelevant to the grid pattern included in the input image based on the kernels and to detect the grid pattern included in the input image.

10. The image processing system according to claim 9, wherein:
the kernel manager is configured to generate a first kernel having a size of (N+1)×(N+1),
the first kernel having a value of 1 at a central position of the first kernel and positions corresponding to both ends of an x-axis direction with respect to the central position, both ends of a y-axis direction with respect to the central position, and ends of a diagonal direction with respect to the central position, and having a value of 0 at remaining positions, and
wherein the image blurrer is configured to determine a size of a mask used for a blur operation based on the size of the first kernel and perform the blur operation of changing the pixel values to correspond to a normal distribution along the mask moving in the input image.

11. The image processing system according to claim 10, wherein the image blurrer is configured to determine the size of the mask to be smaller than twice the size of the first kernel by 1, and perform a Gaussian blur operation on the input image using the mask.

12. The image processing system according to claim 10, wherein the pixel value amplifier is configured to amplify the pattern pixel values based on a correlation coefficient corresponding to the first kernel, and normalize the pixel values corresponding to the input image to integers falling within a preset range.

13. The image processing system according to claim 10, wherein:
the kernel manager is configured to generate a second kernel having a value of 1 at all positions and having a size of (N/2+1)×(N/2+1), and
the grid pattern detector is configured to remove textures larger than the grid pattern from the input image based on the second kernel.

14. The image processing system according to claim 13, wherein the grid pattern detector is configured to perform a grid pattern detection operation of removing textures other than the grid pattern from the input image based on the first kernel, and generate a grid image including only the grid pattern.

15. The image processing system according to claim 14, wherein the grid pattern detector is configured to set a number of times that the grid pattern detection operation is to be performed based on at least one of the input image, the N×N array pattern of the color filter array, or a detection strength, and perform the grid pattern detection operation a set number of times.

16. An image processing method, comprising:
generating kernels corresponding to a grid pattern determined based on an N×N array pattern of a color filter array included in an image sensor;

removing normal noise smaller than the grid pattern included in an input image based on externally received pixel values and the kernels;

amplifying pattern pixel values corresponding to the grid pattern, among the pixel values; and removing textures irrelevant to the grid pattern included in the input image, based on the kernels, and detecting the grid pattern included in the input image.

17. The image processing method according to claim 16, wherein:

generating the kernels comprises:

generating a first kernel having a value of 1 at a central position (0,0) and positions (0, N/2), (0, −N/2), (N/2, 0), (N/2, N/2), (N/2, −N/2), (−N/2, 0), (−N/2, N/2), and (−N/2, −N/2) and having a value of 0 at remaining positions, and removing the normal noise comprises:

determining a size of a mask used for a blur operation based on the size of the first kernel; and performing the blur operation of changing the pixel values to correspond to a normal distribution along the mask moving within the input image.

18. The image processing method according to claim 17, wherein amplifying the pattern pixel values comprises:

amplifying the pattern pixel values based on a correlation coefficient corresponding to the first kernel; and normalizing pixel values corresponding to the input image to integers falling within a preset range.

19. The image processing method according to claim 18, wherein generating the kernels further comprises:

generating a second kernel having a value of 1 at all positions and having a size of (N/2+1)×(N/2+1), and detecting the grid pattern comprises:

removing textures larger than the grid pattern from the input image based on the second kernel;

performing a grid pattern detection operation of removing textures other than the grid pattern from the input image based on the first kernel; and generating a grid image including only the grid pattern.

20. The image processing method according to claim 19, wherein performing the grid pattern detection operation comprises:

setting a number of times that the grid pattern detection operation is to be performed based on at least one of the input image, the N×N array pattern of the color filter array, or a detection strength; and performing the grid pattern detection operation a set number of times.

* * * * *